(12) United States Patent
Einfeldt et al.

(10) Patent No.: US 6,893,497 B2
(45) Date of Patent: May 17, 2005

(54) USE OF WATER-SOLUBLE POLYSACCHARIDE DERIVATIVES AS DISPERSING AGENTS FOR MINERAL BINDER SUSPENSIONS

(75) Inventors: Lars Einfeldt, Jena (DE); Gerhard Albrecht, Tacherting (DE); Alfred Kern, Kirchweidach (DE); Matilde Calado Vieira, Messines (PT); Dieter Klemm, Weimar (DE)

(73) Assignee: Degussa Construction Chemicals GmbH, Trostberg (DE)

( * ) Notice: Subject to any disclaimer, the term of this patent is extended or adjusted under 35 U.S.C. 154(b) by 0 days.

(21) Appl. No.: 10/472,558

(22) PCT Filed: Mar. 21, 2002

(86) PCT No.: PCT/EP02/03191

§ 371 (c)(1),
(2), (4) Date: Sep. 19, 2003

(87) PCT Pub. No.: WO03/002479

PCT Pub. Date: Jan. 9, 2003

(65) Prior Publication Data

US 2004/0103824 A1 Jun. 3, 2004

(30) Foreign Application Priority Data

Mar. 22, 2001 (DE) .......................... 101 13 975

(51) Int. Cl.$^7$ .......................... C04B 24/38; C04B 24/16
(52) U.S. Cl. ............ 106/804; 106/170.57; 106/170.58; 106/197.01; 106/198.1; 106/217.01; 106/217.3; 106/691; 106/696; 106/726; 106/727; 106/729; 106/730; 106/779; 106/780; 106/795; 106/805; 106/823
(58) Field of Search ................ 106/170.57, 170.58, 106/197.01, 198.1, 217.01, 217.3, 691, 696, 726, 727, 729, 730, 779, 780, 795, 804, 805, 823

(56) References Cited

U.S. PATENT DOCUMENTS

| | | | | |
|---|---|---|---|---|
| 2,978,446 A | * | 4/1961 | Battista et al. ................ 536/56 |
| 3,141,875 A | * | 7/1964 | Battista et al. ................ 536/56 |
| 3,146,168 A | * | 8/1964 | Battista ...................... 424/526 |
| 3,157,518 A | * | 11/1964 | Battista ...................... 426/125 |
| 3,258,354 A | * | 6/1966 | Battista ................... 106/163.01 |
| 3,259,537 A | * | 7/1966 | Battista ...................... 428/393 |
| 3,278,519 A | * | 10/1966 | Battista et al. ................ 536/56 |
| 3,357,845 A | * | 12/1967 | Battista ................... 106/163.01 |
| 3,562,289 A | * | 2/1971 | Battista ...................... 548/339.1 |
| 4,330,441 A | | 5/1982 | Bohmer et al. |
| 4,466,837 A | * | 8/1984 | Chatterji et al. ............ 106/726 |
| 4,707,187 A | | 11/1987 | Tsuda et al. |
| 5,182,380 A | | 1/1993 | Breckwoldt et al. |
| 5,346,589 A | * | 9/1994 | Braunstein et al. ............ 162/72 |
| 5,358,561 A | | 10/1994 | Kiesewetter et al. |
| 5,372,642 A | | 12/1994 | Bartz et al. |
| 5,385,607 A | | 1/1995 | Kiesewetter et al. |
| 5,543,511 A | * | 8/1996 | Bergfeld et al. ............... 536/56 |
| 5,573,589 A | | 11/1996 | Tanaka et al. |
| 5,591,844 A | * | 1/1997 | Bartz et al. .................... 536/90 |
| 6,559,300 B1 | | 5/2003 | Simon et al. |
| 6,627,749 B1 | * | 9/2003 | Kumar ........................ 536/56 |
| 2003/0089465 A1 | * | 5/2003 | Schaible et al. .............. 162/19 |

FOREIGN PATENT DOCUMENTS

| | | |
|---|---|---|
| CH | 418 209 A | 7/1966 |
| DE | 1469804 A * | 1/1969 |
| DE | 20 60 106 A | 3/1972 |
| DE | 29 00 110 A1 | 7/1980 |
| DE | 32 03 067 C2 | 8/1982 |
| DE | 34 06 745 A1 | 9/1984 |
| DE | 39 10 730 A | 10/1990 |
| DE | 39 20 025 C2 | 1/1991 |
| DE | 40 24 968 A1 | 7/1992 |
| DE | 42 03 529 A1 | 8/1993 |
| DE | 42 03 530 A1 | 8/1993 |
| DE | 44 07 499 A1 | 9/1994 |
| DE | 19543304 A | 5/1997 |
| DE | 39 09 070 C2 | 12/1998 |
| DE | 197 31 575 A1 | 1/1999 |
| EP | 0 554 749 A | 8/1993 |
| EP | 0 573 847 A1 | 12/1993 |
| EP | 0 573 852 A | 12/1993 |
| EP | 0 816 299 A | 1/1998 |
| GB | 2 080 812 A | 2/1982 |
| GB | 2 138 014 A | 10/1984 |
| WO | WO00/68272 A1 * | 11/2000 |

OTHER PUBLICATIONS

Carboxymethylated or Sufoethoxylated Methyl Hydroxyethyl or Methyl Hydroxypropyl Cellulose Ethers in Building applications, Research Disclosure, Kenneth Mason Publications, No. 418,(Feb. 1999).

* cited by examiner

*Primary Examiner*—Anthony J. Green
(74) *Attorney, Agent, or Firm*—Fulbright & Jaworski L.L.P.

(57) ABSTRACT

The invention concerns the use of water-soluble polysaccharide derivatives as dispersing agents for mineral binder suspensions. A partially hydrolyzed cellulose containing carboxyl groups and optionally hydroxyalkyl and/or sulfate groups and/or a partially hydrolyzed amylose-rich starch which also has sulfoalkyl groups with 1 to 4 carbon atoms is used as the polysaccharide derivative. These polysaccharide derivatives have a low viscosity and an excellent plasticizing effect in mineral binder suspensions, especially in those based on cement, lime and/or gypsum.

14 Claims, No Drawings

USE OF WATER-SOLUBLE POLYSACCHARIDE DERIVATIVES AS DISPERSING AGENTS FOR MINERAL BINDER SUSPENSIONS

The present invention concerns the use of special water-soluble polysaccharide derivatives as dispersing agents for mineral binder suspensions.

The previously known commercial dispersing agents in particular for mortar and concrete are either condensation products such as sulfonated naphthalene-formaldehyde condensation products (cf. EP-PS 214 412) or sulfonated melamine-formaldehyde condensation products (cf. DE-PS 16 71 017) or polymer compounds such as polyethercarboxylates (cf. EP-A 736 553).

These so-called superplasticizers are polymers that are either not biodegradable or only very poorly biodegradable. If one wants to replace these conventional dispersing agents by biodegradable flow agents then it is obvious to base them on polysaccharides since the latter can be obtained in an environmentally friendly manner from renewable raw materials, they are in principle available in inexhaustible amounts (e.g. starch or cellulose) and are an ecological alternative to the petrochemical polymers.

Numerous polysaccharides (e.g. pullulan, curdlan, dextran, xanthan, welan, rhamsan as microbial exopolysaccharides; algin, carageenan, agar as marine polysaccharides; locust bean, gum arabic as plant exudates) and polysaccharide derivatives (e.g. cellulose ethers such as HEC, CMHEC, HPMC or esters and ethers of starch) have been added in the past as viscosity-modifying agents (VMA) to mineral binding agents. A disadvantage of the previously used polysaccharide derivatives is the fact that they have a high molecular weight and have an extremely high viscosity in water even at low concentrations.

Polysaccharide derivatives that have previously been examined more closely as superplasticizers are without exception anionically-substituted polysaccharides, in particular polysaccharide sulfates (DE-OS 44 07 499, DE-OS 199 21 175) and sulfoalkyl polysaccharides (DE-OS 34 06 745). The described sulfoalkyl polysaccharides are mainly those having degrees of polymerization (DP) of <100, in which starches in particular have been used as starting materials which usually have an amylose content of 20 to 25% in their native form. In general the disclosed polysaccharide sulfates are hydrolyzed or depolymerized polysaccharides from a variety of sources and in particular non-ionic cellulose ethers, curdlan and various starches and starch derivatives.

However, it has turned out that a disadvantage of these polysaccharide derivatives is that their plasticizing effect is suboptimal in many fields of application in comparison to conventional flow agents.

Hence the object of the present invention was to provide water-soluble polysaccharide derivatives as dispersing agents for mineral binders which do not have the said disadvantages of the prior art but rather have good technical application properties compared to conventional flow agents.

This object was achieved according to the invention by using a partially hydrolyzed cellulose containing carboxyl groups which additionally optionally contains hydroxyalkyl and/or sulfate groups and/or a partially hydrolyzed amylose-rich starch which also has sulfoalkyl groups containing 1 to 4 C atoms as a polysaccharide derivative.

It surprisingly turned out that the proposed polysaccharide derivatives according to the invention have an extremely low viscosity due to their relatively low molecular weights which remains very constant over a wide shear range for practical applications. In addition the dispersing action of conventional flow agents is considerably surpassed in some cases by the polysaccharide derivatives according to the invention which was also unexpected.

The proposed polysaccharide derivatives according to the invention consist of partially hydrolyzed celluloses and/or starches.

According to a preferred embodiment so-called level-off DP-celluloses (LODP-celluloses) having a degree of polymerization (DP) of 20 to 150 and in particular 30 to 50 are used as partially hydrolyzed celluloses.

An important feature of the invention is that the partially hydrolyzed celluloses contain carboxyl groups. The degree of substitution (MS) for the carboxyl groups in the anhydroglucose unit (AGU) of the partially hydrolyzed cellulose is preferably 0.3 to 2.0 and in particular 0.5 to 1.5.

In this connection it has proven to be particularly advantageous when the carboxyl groups consist of carboxymethyl ($-CH_2-COOH$) residues. Instead of the carboxymethyl residues, salts thereof can also be used without difficulty whereby the monovalent salts comprising sodium, potassium and ammonium salts of carboxymethyl residues are preferred.

Within the scope of the present invention it is also possible for the partially hydrolyzed celluloses containing carboxyl groups to also contain hydroxyalkyl and/or sulfate groups. The hydroxyalkyl groups which consist in particular of 2 to 4 C atoms have a preferred degree of substitution (MS) in the AGU of the partially hydrolyzed cellulose of 0.1 to 5.0. Hydroxyethyl residues having a degree of substitution (MS) of 0.5 to 3.5 are particularly preferred in this connection. In the case of the sulfated celluloses the degree of sulfation is preferably between 0.1 and 2.0.

Sodium salts of carboxymethyl celluloses (CMC), carboxymethylhydroxyethyl celluloses (CMHEC) and carboxymethylcellulose sulfonates (CMCS) are particularly preferred cellulose derivatives that can be used as dispersing agents within the scope of the present invention.

In addition to the partially hydrolyzed cellulose derivatives, partially hydrolyzed amylose-rich starches can also be used according to the invention. The starches should preferably have a degree of polymerization (DP) of 40 to 500 and the amylose content in the starches should preferably be 30 to 90%, in particular 40 to 75% by weight. According to a preferred embodiment the amylose-rich starches also contain sulfoalkyl groups having a preferred degree of substitution (DS) of 0.2 to 2.0. In this connection sulfoethyl groups having a degree of substitution (DS) of 0.3 to 1.0 are particularly preferred.

The relatively low molecular weights of the proposed polysaccharide derivatives according to the invention can be obtained by known methods for the acid hydrolysis of cellulose for example in the form of wood pulp, cellulose generates, microcrystalline celluloses or other cellulose materials (Battista, O. A., Coppiek, S., Howsmon, J. A., Morehead, F. F. and Sisson, W. A. (1956) Level-off Degree of Polymerization. *Ind. Eng. Chem.* 48, 333–335; Immergut, E. A. and Ranby, B. G. (1956) Heterogeneous Acid Hydrolysis of Native Cellulose Fibres. *Ind. Eng. Chem.* 48, 1183–1189; Sharples, A. (1958) The Hydrolysis of Cellulose and Its Relation to Structure. *Trans Farad. Soc.* 54, 913–917) or starch for example in the form of maize starch, wax maize starch or potato starch (Fox, J. D., and Robyt, J. F. (1992) *Carbohydr. Res.* 227, 163–170; Galinsky, G. and Burchard, W. (1995) *Macromolecules* 28, 2363–2370; Singh, V. S. and Ali, S. Z. (2000) *Carbohydr. Polym.* 41, 191–195). Whereas in the case of starches partial depolymerization depends extremely strongly on the hydrolysis conditions (e.g. suspension medium, mineral acid, concentration of the mineral acid, hydrolysis time and temperature), heterogeneous hydrolysis of celluloses produces so-called LODP celluloses which yield relatively uniform level-off DP depending only on the cellulose starting material which are presumably microcrystallites of cellulose microfibrils at a molecular level (Yachi, T., Hayashi, T., Takai, M. and Shimizu, Y. (1983) Supramolecular Structure of Cellulose: Stepwise Decrease in LODP and Particle Size of Cellulose Hydrolysed after Chemical Treatment. *J. Appl. Polym. Sci., Appl. Polym. Symp.* 37, 325–343).

The partially hydrolyzed celluloses or starches are also functionalized by known methods. Hence the carboxyl groups are introduced by alkylcarboxylates containing halogen or alkylene oxide whereby the more economical chloroacetic acid can be used in the case of the carboxymethyl group. The sulfate group is introduced especially by esterifying the celluloses with a conventional sulfation reagent such as sulfuric acid, chlorosulfonic acid but preferably with mild $SO_3$ complexes.

Alkylsulfonates containing halogen or alkylene oxide, sulfones and especially aqueous solutions of sodium vinylsulfonate have proven to be especially suitable sulfoalkylation agents for introducing sulfoalkyl groups into the amylose-rich starch.

The low viscosity and the good plasticizing action of the polysaccharide derivatives according to the invention makes them especially suitable as dispersing agents for mineral binder suspensions especially those based on cement, lime and/or gypsum where they are used in an amount of 0.1 to 5% by weight based on the binder content of the corresponding hydraulically hardened building material mixtures (such as mortar, concrete or plaster).

The following examples are intended to further illustrate the invention.

EXAMPLES

Example 1

Carboxymethylhydroxyethyl Cellulose (CMHEC)

146 g LODP cellulose (hydrolyzed pine sulfite pulp) was suspended in 1 of an 87% (w/w) t-butanol solution in a pressure reactor under an argon atmosphere and alkalized for 1 h at 50° C. with 1 moleq. 20 N NaOH. Subsequently 5 moleq. ethylene oxide was added within 30 min at room temperature, it was stirred for 3 h at 70° C., cooled and neutralized with acetic acid. The suspending medium was decanted and the product was resuspended in acetone, suction filtered and dried.

0.3 mol of the crude product of this hydroxyethyl cellulose (HEC) was suspended in 800 ml isopropanol and alkalized for 1 h at room temperature with 3 moleq. 20 N NaOH under an argon atmosphere. Subsequently 1.5 moleq. chloroacetic acid dissolved in isopropanol (chloroacetic acid: isopropanol=(w/v) 1:2) was added dropwise at room temperature, stirred for 3 h at 70° C., cooled and neutralized with acetic acid. The product is suction filtered and the water-soluble components (salts, low molecular carbohydrates) could be almost completely separated by washing processes e.g. with aqueous methanol or aqueous acetone. A substitution of MSHE=3.57 and DSCM=1.47 was achieved. (The CMHEC was dissolved in water for the described analyses and dialysed for 3 days against water).

Example 2

Cellulose Sulfate (CS)

13.2 g LODP cellulose (partially hydrolyzed viscose) was suspended in 40 ml DMF and activated for about 3–4 h at 100° C. under an argon atmosphere. 3 moleq. $DMF*SO_3$ was added in portions while cooling during which a further 40 ml DMF were added. It was stirred for 3 h at room temperature, 80 to 100 ml water was added and it was neutralized with 20 N NaOH. The viscous solution is precipitated in aqueous methanol, the product is dissolved in water and dialysed for 3 days against water. Alternatively it can also be processed as described in example 1. A substitution of $DS_S$=1.98 in the AGU is achieved.

Example 3

Sulfoethyl Starch (SES)

Variant A: 15 g partially hydrolyzed amylomaize starch was suspended in 750 ml isopropanol and alkalized with 3 moleq. of a 50% NaOH solution for 1.5 h at room temperature under an argon atmosphere. 1.5 moleq. of a 30% sodium vinyl sulfonate solution was slowly added dropwise in 3 portions within 2 h and stirred for 5 h at 55° C.

Variant B: 10 g partially hydrolyzed amylomaize starch was suspended in 270 ml isopropanol and 1.2 moleq. of a ca. 50% sodiumvinyl sulfonate solution which had previously been freshly prepared by concentrating a 30% sodium vinyl sulfonate solution under reduced pressure was slowly added dropwise. 2.3 moleq. powderized NaOH was added and stirred for 3.5 h at 75° C.

The suspending agent was decanted, the product was dissolved in water, neutralized with diluted hydrochloric acid and dialysed against water for 3 days. Alternatively it can also be processed as described in example 1. Whereas with variant A preferably SES having a $DS_{SE}$ of 0.3 to 0.4 is produced, variant B yields SES preferably with a $DS_{SE}$ of 0.4 to 0.6.

Example 4

The molecular parameters of the cellulose derivatives that were used according to the invention and their spreading factor according to DIN 1164/EN-196 are shown in the following table 1 in comparison to conventional dispersing agents.

The viscosity of the flow agents containing cellulose and starch was examined as a 20% by weight solution in distilled water on a HAAKE rheometer "Rheostress RS 150". Depending on the viscous state of this solution, the rotation and oscillation measurements were either carried out on a Titan C60/1 cone plate or in a Titan DG41 double slit cylinder. Specifically the viscosity η was measured at a shear rate γ of $10^{-2}$, $10^{0}$ and $10^{2}$ $s^{-1}$ at 25° C.

In order to determine the molecular weight, the partially hydrolyzed celluloses and starches were suspended in DMF or DMSO, an excess of pyridine and acetic anhydride was added and they were catalytically peracetylated at 50° C. with DMAP. Corresponding triacetates of the partially hydrolyzed celluloses and starches ($DS_{AC}$=3.0) are soluble in chloroform. There is no significant degradation of the glucan chains under these mild peracetylation conditions.

The molecular weight of the peracetylated, partially hydrolyzed celluloses and starches was determined on a GPC apparatus from JASCO (eluant: chloroform, flow rate: 1.0 ml/min, 25° C., detection: RI 930, UV 975, columns: phe3, phe5). It was calibrated with polystyrene standards which can undisputedly be used to correctly determine the molecular weights of peracetylated polysaccharides having a DP<100. The molar masses were determined using the PSS standard software.

The degree of sulfoethylation ($DS_{SE}$) was ascertained by determining the sulfur content on an elemental analyser.

The degree of carboxymethylation ($DS_{CM}$) was determined gravimetrically according to C. V. Francis Anal. Chem. 25 (1953) 941–943 using the so-called uranyl determination method, or alternatively after a total hydrolysis on a HPLC system from JASCO (eluant: 0.01 N sulfuric acid, flow rate: 0.5 ml/min, 65° C., detection: refractive index, polarimeter detector, columns: 2 Bio-Rad Aminex HPX-87H) according to T. Heinze, K. Pfeiffer, "Angew. Makromol. Chem." 266 (1999), 37–45.

The degree of hydroxyethylation ($MS_{HE}$) can be determined by $^1$H-NMR spectroscopy if the HEC has been previously peracetylated by the above-mentioned method. For this 2% by weight solutions of the peracetylated HEC were measured in deuterated chloroform. The $MS_{HE}$ can be calculated from the equation $MS_{HE}=\frac{1}{4}(9\Sigma\int[5.5-3.2\ ppm]\div\Sigma\int[2.41-1.7\ ppm]-7)$.

TABLE 1

| Experiment | Dispersing agent | Molecular we | Substitution[2] AGU | Viscosity[3] (20% solution) [Pa * s] η0.01 | η1 | η100 | Degree of spreading [cm] | Degree of spreading blank sample [cm] |
|---|---|---|---|---|---|---|---|---|
| 1 | CMC | $DP_w$ = 38 | $DS_{CM}$ = 1.79 | | 0.02 | 0.01 | 19.3 | +4.0 |
| 2 | CMHEC | $DP_w$ = 38 | $MS_{HE}$ = 2.15 $DS_{CM}$ = 0.96 | 0.10 | 0.02 | 0.01 | 21.5 | +6.2 |
| 3 | CMHEC | $DP_w$ = 77 | $MS_{HE}$ = 3.57 $DS_{CM}$ = 0.45 | 0.28 | 3.03 | 2.30 | 19.3 | +5.7 |
| 4 | CMHEC | $DP_w$ = 77 | $MS_{HE}$ = 3.57 $DS_{CM}$ = 1.47 | 5.30 | 3.20 | 2.05 | 17.8 | +4.2 |
| 5 | CMHEC | $DP_w$ = 139 | $MS_{HE}$ = 3.06 $DS_{CM}$ = 0.79 | | 2.02 | 1.85 | 21.2 | +6.0 |
| | | | | 3.20 | | | | |
| | | | | 2.04 | | | | |
| 6 | Liquiment N | | | | | | 20.6 | +5.3 |
| 7 | MelmentL10 | | | | | | 18.9 | +3.6 |
| 8 | blank sample | | | | | | 15.8 | ±0.0 |

Example 5

The molecular parameters of the starch derivatives used according to the invention (obtained from partially hydrolyzed amylose starch having an amylose content of 70% by weight) and their degree of spreading according to DIN 1164/EN-196 are shown in the following table 2 in comparison to conventional dispersing agents.

TABLE 2

| Exper. | Dispersing agent | Molecular weight[1] | Substitution[2] AGU | Viscosity[3] [Pa * s] η1 | (20% sol.) η300 | Degree of spreading [cm] | Degree of spreading blank sample [cm] |
|---|---|---|---|---|---|---|---|
| 1 | SES | $DP_w$ = 43 | $DS_{SE}$ = 0.55 | 0.010 | 0.008 | 30.0 | +15.5 |
| 2 | SES | $DP_w$ = 63 | $DS_{SE}$ = 0.35 | 0.020 | 0.012 | 25.1 | +10.6 |
| 3 | SES | $DP_w$ = 63 | $DS_{SE}$ = 0.36 | 10.000 | 0.030 | 22.2 | +8.6 |
| 4 | SES | $DP_w$ = 63 | $DS_{SE}$ = 0.38 | 0.500 | 0.020 | 24.0 | +10.4 |
| 5 | SES | $DP_w$ = 63 | $DS_{SE}$ = 0.43 | 0.020 | 0.015 | 27.0 | +13.4 |
| 6 | SES | $DP_w$ = 160 | $DS_{SE}$ = 0.30 | 0.350 | 0.095 | 19.7 | +3.9 |
| 7 | SES | $DP_w$ = 160 | $DS_{SE}$ = 0.45 | 0.030 | 0.027 | 28.0 | +12.2 |
| 8 | SEHES | $DP_w$ = 122 | $MS_{HE}$ = 1.80 $DS_{SE}$ = 0.80 | n.d. | n.d. | 21.3 | +5.5 |
| 9 | LiquimentN | | | | | 20.6 | |
| 10 | MelmentL10 | | | | | 18.9 | |
| 11 | blank sample | | | | | 15.8 | |

Example 6

The results of the dispersing action for mortars according to DIN 1164/EN-96 containing the cellulose derivatives according to the invention (table 3) and starch derivatives are summarized in the following tables 3 and 4. According to the standard 450 g Portland cement (Mannersdorf 375H), 450 g standard fine sand, 900 g standard coarse sand and 225 g mixing water (containing the dissolved polysaccharide derivative) were mixed and subsequently the degree of spreading was determined.

TABLE 3

| Experiment | Dispersing agent | Degree of polymerization [DP] | Solids content [%] | W/C | Solid resin rel. to PC [%] | Weighed quantity (100%) [g] | Weighed quantity liquid resin [g] | Degree of spreading [cm] | Air pore content[1] [vol. %] |
|---|---|---|---|---|---|---|---|---|---|
| 1 | Liquiment N | | 92.4 | 0.5 | 0.45 | 2.025 | 2.192 | 21.4 | 5.10 |
| 2 | blank sample | | n.r. | 0.5 | n.r. | n.r. | n.r. | 15.8 | 5.53 |
| 3 | Liquiment N powder standard | | 92.4 | 0.5 | 0.45 | 2.025 | 2.192 | 20.6 | 5.73 |
| 4 | Melment L10 standard | | 21.6 | 0.5 | 0.45 | 2.025 | 9.375 | 18.9 | 4.45 |
| 5 | CMC ($DS_{CM}$ = 1.79) | 38 | 100 | 0.5 | 0.45 | 2.025 | 2.025 | 19.3 | 4.23 |
| 6 | CMC ($DS_{CM}$ = 1.44) | 139 | 100 | 0.5 | 0.45 | 2.025 | 2.025 | 14.5 | 3.90 |
| 7 | CMHEC ($MS_{HE}$ = 2.15, $DS_{CM}$ = 0.96) | 38 | 100 | 0.5 | 0.45 | 2.025 | 2.025 | 21.5 | 14.04 |
| 8 | CMHEC ($MS_{HE}$ = 2.15, $DS_{CM}$ = 0.96)[2] | 38 | 100 | 0.5 | 0.45 | 2.025 | 2.025 | 21.3 | 4.08 |
| 9 | CMMEC ($MS_{HE}$ = 3.06, $DS_{CM}$ = 0.79) | 139 | 100 | 0.5 | 0.45 | 2.025 | 2.025 | 21.2 | 16.77 |
| 10 | CMHEC ($MS_{HE}$ = 3.06, $DS_{CM}$ = 0.79)[2] | 139 | 100 | 0.5 | 0.45 | 2.025 | 2.025 | 21.5 | 3.01 |
| 11 | CMHEC ($MS_{HE}$ = 3.57, $DS_{CM}$ = 0.45)[2] | 77 | 100 | 0.5 | 0.45 | 2.025 | 2.025 | 19.3 | 3.40 |
| 12 | CMHEC ($MS_{HE}$ = 3.57, $DS_{CM}$ = 1.47)[2] | 77 | 100 | 0.5 | 0.45 | 2.025 | 2.025 | 17.8 | 3.95 |

[1]calculated from the fresh volumetric weight
[2]defoamed with 75 μl Degresal SD20 corresponding to 1.0–1.5% w defoamer from a 40% solution

TABLE 4

Dispersing test* based on mortar according to DIN 1164/EN-196

| Experiment | Dispersing agent | Degree of polymerization [DP] | Solids content [%] | W/C | Solid resin rel. to PC [%] | Weighed quantity (100%) [g] | Weighed quantity liquid resin [g] | Degree of spreading [cm] | Air pore content[1] [vol. %] |
|---|---|---|---|---|---|---|---|---|---|
| 1 | Liquiment N powder standard | | 92.4 | 0.5 | 0.45 | 2.025 | 2.192 | 21.4 | 5.10 |
| 2 | zero sample | | n.r. | 0.5 | n.r. | n.r. | n.r. | 15.8 | 5.53 |
| 3 | SES ($DS_{SE}$ = 0.55) | 43 | 100 | 0.5 | 0.45 | 2.025 | 2.025 | 30.0 | 2.09 |
| 4 | SES ($DS_{SE}$ = 0.35) | 63 | 100 | 0.5 | 0.45 | 2.025 | 2.025 | 25.1 | 2.60 |
| 5 | SES ($DS_{SE}$ = 0.36) | 63 | 100 | 0.5 | 0.45 | 2.025 | 2.025 | 22.2 | 1.96 |
| 6 | SES ($DS_{SE}$ = 0.38) | 63 | 100 | 0.5 | 0.45 | 2.025 | 2.025 | 24.0 | 3.45 |
| 7 | SES ($DS_{SE}$ = 0.43) | 63 | 100 | 0.5 | 0.45 | 2.025 | 2.025 | 27.0 | 2.33 |
| 8 | SES ($DS_{SE}$ = 0.30) | 160 | 100 | 0.5 | 0.45 | 2.025 | 2.025 | 19.7 | 4.18 |
| 9 | SES ($DS_{SE}$ = 0.45) | 160 | 100 | 0.5 | 0.45 | 2.025 | 2.025 | 28.0 | 4.03 |
| 10 | HESES ($MS_{HE}$ = 1.80, $DS_{SE}$ = 0.80)[2] | 122 | 100 | 0.5 | 0.45 | 2.025 | 2.025 | 21.3 | 3.41 |

[1]calculated from the fresh volumetric weight
[2]defoamed with 75 μl Degresal SD20 corresponding to 1.0–1.5% w defoamer from a 40% solution

Example 7

The influence of the amylose content of partially hydrolyzed starches on the plasticizing action in mortar mixtures is illustrated in the following table 5.

TABLE 5

| | | Chemical Modification | | Viscosity (20% sol) | | Degree of spreading | Degree of spreading-blank sample |
|---|---|---|---|---|---|---|---|
| | | 1.) partial | 2.) sulfo | [Pa * s] | | | |
| Experiment | Starch | depolymer. | ethylation | $\eta 1$ | $\eta 300$ | [cm] | [cm] |
| 1(E) | amylomaize starch[1] | acid hydrolysis | $DS_{SE} = 0.55$ | 0.010 | 0.008 | 30.0 | +15.5 |
| 2(V) | wax maize starch[2] | acid hydrolysis | $DS_{SE} = 0.45$ | 0.070 | 0.050 | 12.0 | −1.6 |
| 3(V) | wax maize starch[2] | oxidative | $DS_{SE} = 0.49$ | 0.060 | 0.040 | 12.8 | −1.7 |
| 4(V) | maize starch[3] | oxidative | $DS_{SE} = 0.48$ | 0.045 | 0.030 | 13.2 | −1.3 |
| 5(V) | maize starch[3] | thermal | $DS_{SE} = 0.55$ | 0.045 | 0.030 | 13.7 | −0.8 |
| | potato starch[3] | oxidative | $DS_{SE} = 0.48$ | 0.060 | 0.045 | 12.3 | −2.2 |

[1] amylose content 70%
[2] amylose content 1%
[3] amylose content < 25%

Example 8

The influence of partial hydrolysis (depolymerization) of amylomaize starch on the plasticizing action in mortar mixtures is shown in the following table 6.

TABLE 6

| Experiment | Dispersing agent | Amylomaize starch (ca. 70% amylose) a) depolymerized b) not degraded | Substitution AGU | Viscosity (20% sol.) [Pa * s] | | Degree of spreading [cm] | Degree of spreading-blank sample [cm] |
|---|---|---|---|---|---|---|---|
| | | | | $\eta 1$ | $\eta 300$ | | |
| 1(E) | SES | a) $DP_w = 43$ | $DS_{SE} = 0.55$ | 0.010 | 0.008 | 30.0 | +15.5 |
| 2(V) | SES | b) not hydrolyzed | $DS_{SE} = \beta.56$ | 0.230 | 0.120 | 11.3 | −3.2 |

What is claimed is:

1. A method for preparing a mineral binding agent suspension, comprising:

mixing a polysaccharide derivative with a mineral binding agent, wherein said polysaccharide derivative is a partially hydrolyzed cellulose containing carboxyl groups which optionally also contains at least one of an hydroxyalkyl group and sulfate group wherein said partially hydrolyzed cellulose is a level-off DP-cellulose (LODP-cellulose) having a degree of polymerisation (DP) of 20 to 150 or a partially hydrolyzed amylose-rich starch having an amylose content and which contains sulfoalkyl groups containing 1 to 4 carbon atoms wherein the amylose content in the partially hydrolyzed amylose-rich starch ranges from 30 to 90% by weight.

2. The metnod of claim 1, wherein said level-off DP cellulose (LODP cellulose) has a degree of polymerization of 30 to 50.

3. The method of claim 1, wherein the carboxyl groups of the partially hydrolyzed cellulose containing carboxyl groups are a carboxymethyl residue or a salt of a carboxymethyl residue.

4. The method of claim 3, wherein said salt is selected from the group consisting of a sodium salt, a potassium salt and an ammonium salt.

5. The method of claim 1, wherein said carboxyl groups in an anhydroglucose unit (AGU) have a degree of substitution (DS) of the partially hydrolyzed cellulose from 0.3 to 2.0.

6. The method of claim 1, wherein hydroxyalkyl groups of the partially hydrolyzed cellulose containing carboxyl groups which comprise 2 to 4 carbon atoms and have a degree of substitution (MS) in an anhydroglucose unit (AGU) of the partially hydrolyzed cellulose containing carboxyl groups of from 0.1 to 5.0.

7. The method of claim 6, wherein the hydroxyalkyl groups comprise hydroxyethyl residues and have a degree of substitution (MS) of 0.5 to 3.5.

8. The method of claim 1 wherein the partially hydrolyzed cellulose containing carboxyl groups have a degree of sulfation between 0.1 and 2.0.

9. The method of claim 1, wherein the partially hydrolyzed, amylose-rich starch has a degree of polymerization (DP) of 40 to 500.

10. The method of claim 1, wherein the amylose content of the partially hydrolyzed amylose-rich starch is 40 to 75% by weight.

11. The method of claim 1, wherein a degree of substitution (DS) for the sulfoalkyl groups of the partially hydrolyzed amylose-rich starch is between 0.2 and 2.0.

12. The method of claim 1, wherein the partially hydrolyzed amylose-rich starch has sulfoethyl groups with a degree of substitution (DS) of between 0.3 and 1.0.

13. The method of claim 1, wherein the polysaccharide derivative is present in an amount of 0.1 to 5.0% by weight relative to the binding agent of the mineral binding agent suspension.

14. The method of claim 1, wherein the mineral binding agent comprises at least one agent selected from the group consisting of cement, lime and gypsum.

\* \* \* \* \*